US010031987B2

(12) United States Patent
Meil

(10) Patent No.: US 10,031,987 B2
(45) Date of Patent: Jul. 24, 2018

(54) VERIFICATION OF UNTIMED NETS

(71) Applicant: International Business Machines Corporation, Armonk, NY (US)

(72) Inventor: Gavin B. Meil, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/182,655

(22) Filed: Jun. 15, 2016

(65) Prior Publication Data

US 2017/0364620 A1    Dec. 21, 2017

(51) Int. Cl.
*G06F 17/50* (2006.01)

(52) U.S. Cl.
CPC ........ *G06F 17/5031* (2013.01); *G06F 17/505* (2013.01); *G06F 2217/84* (2013.01)

(58) Field of Classification Search
CPC . G06F 17/5031; G06F 17/505; G06F 2217/84
USPC ................................ 716/106, 108, 132, 134
See application file for complete search history.

(56) References Cited

U.S. PATENT DOCUMENTS

| 4,937,765 | A | * | 6/1990 | Shupe | .............. | G01B 31/31832 |
| | | | | | | 702/187 |
| 6,131,081 | A | * | 10/2000 | Maurer | ............... | G06F 17/5022 |
| | | | | | | 703/16 |
| 8,122,410 | B2 | | 2/2012 | DiLullo et al. | | |
| 9,268,889 | B2 | | 2/2016 | Meil | | |
| 2006/0052994 | A1 | | 3/2006 | Takei | | |
| 2009/0132983 | A1 | | 5/2009 | Gass et al. | | |
| 2010/0115482 | A1 | | 5/2010 | DiLullo et al. | | |

(Continued)

FOREIGN PATENT DOCUMENTS

| KR | 20100050386 A | 5/2010 |
| WO | 2006084845 A2 | 7/2006 |
| WO | 2010113330 A2 | 10/2010 |

OTHER PUBLICATIONS

Bowman, Keith A., et al., "Energy0efficient and metastability immune resilient circuits or dynamic variation tolerance", Jan. 2009, IEEE Journal of Solid State Circuits, vol. 44, No. 1, pp. 49-63.*

(Continued)

*Primary Examiner* — Stacy Whitmore
(74) *Attorney, Agent, or Firm* — Patterson + Sheridan, LLP

(57) ABSTRACT

Integrated circuits (ICs) rely on static timing analysis during their design to ensure that they will operate at desired frequencies. Delays between sequential elements (e.g., latches and flip-flops) are constrained to meet target clock periods. Certain signals, however, such as untimed nets may be excluded from timing constraints if the circuit function does not require these nets to switch and propagate to sequential elements within the clock period. However, a signal marked as "untimed" may have been mistakenly specified by the designer as an untimed net. To verify that an untimed net does not negatively impact the function of the design logic, the embodiments herein generate upstream and downstream event networks using shadow logic that corresponds to design logic upstream and downstream of the untimed net. A metastability network coupled to these networks is used to model nondeterminism and metastability resulting from transitions or potential glitches on the untimed net.

20 Claims, 9 Drawing Sheets

(56) References Cited

U.S. PATENT DOCUMENTS

2015/0161311 A1 6/2015 Drasny et al.
2015/0193568 A1 7/2015 Mehta
2016/0357899 A1* 12/2016 Gamsa ................. G06F 17/505

OTHER PUBLICATIONS

Pekergin, Nihal et al., "Compositional Verification of Untimed Properties for a Class of Stochastic Automata Networks", In Computer and Information Sciences III, pp. 105-114. Springer London, 2013.

* cited by examiner

VERIFICATION OF UNTIMED NETS

BACKGROUND

Embodiments herein generally relate to the field of circuit design, and, more particularly, to electronic design automation (EDA) tools to perform verification of untimed nets.

In the field of integrated circuit (IC) design, digital electronic circuits are typically initially represented by a high-level abstraction written in a hardware description language (HDL). Verification, e.g., functional analysis, is performed on a model of the HDL representation, also referred to as an RTL model, to ensure it meets its functional specifications. The HDL representation allows a circuit designer to express all the desired functionality of a digital electronic circuit at the register transfer level (RTL) of abstraction. The HDL representation is then converted into a circuit file through a process known as synthesis that involves translation and optimization. Finally, static timing analysis and equivalence checking are performed on the circuit file. Static timing analysis verifies that the circuit design performs at target clock speeds. Equivalence checking ensures that the circuit file is functionally correct compared to the HDL.

Static timing analysis is used to verify that transitioning values from source latches to sink latches in the nets, or signals, of the circuit design will satisfy the timing requirements of the synchronous logic. In order to simplify static timing analysis, circuit designers commonly identify and eliminate a selected set of non-critical timing paths throughout a circuit design when performing static timing analysis on the circuit design. Such set of non-critical timing paths are usually referred to as a snip, exception, or "don't care" (DC) adjusted list or file (referred to hereafter as a DC adjusted (dcadj) list). The dcadj list may be passed to the static timing tools to thereby identify to the static timing tools that certain nets, or net segments, need not adhere to static timing requirements since their value will not transition or change. These nets are referred to herein as untimed nets or untimed signals since "signal" and "net" are used interchangeably in this application.

A problem arises, however, in that a human designer decides on the dcadj list that is provided to the static timing tool. The designer may think the dcadj list is correct, however, they may fail to realize that some nets specified as untimed nets in the dcadj list will not be "don't care" in certain modes (or conditions) of operation, and thus, should be considered when performing verification. It is also possible that the entry is in a form of a regular expression which inadvertently matches more points (nets or box/pin pairs) in the logic than intended.

SUMMARY

One embodiment of the present disclosure is a method that includes receiving design logic comprising an untimed net, where the untimed net is indicated as being excluded from timing constraints. The method includes generating, using one or more computer processors, an upstream event network using shadow logic, wherein the upstream event network comprises at least one untimed transition detector (UTD) corresponding to a first sequential element upstream from the untimed net in the design logic and generating a downstream event network using shadow logic coupled to an output of the upstream event network, and where the downstream event network comprises at least one metastability timer (MT) corresponding to a second sequential element downstream from the untimed net in the design logic. The method includes generating a metastability network using shadow logic where the metastability network is coupled to an output of the MT.

Another embodiment of the present disclosure is a system that includes at least one computer processor and a memory storing a program, wherein, when executed by the computer processor, the program is configured to perform an operation including receiving design logic comprising an untimed net where the untimed net is indicated as being excluded from timing constraints. The operation also includes generating an upstream event network using shadow logic, wherein the upstream event network comprises at least one untimed transition detector (UTD) corresponding to a first sequential element upstream from the untimed net in the design logic and generating a downstream event network using shadow logic coupled to an output of the upstream event network, wherein the downstream event network comprises at least one metastability timer (MT) corresponding to a second sequential element downstream from the untimed net in the design logic. The operation includes generating a metastability network using shadow logic where the metastability network is coupled to an output of the MT.

Another embodiment of the present disclosure is a computer program product for verifying function of a design logic comprising an untimed net, the computer program product comprising a computer-readable storage medium having computer-readable program code embodied therewith, the computer-readable program code executable by one or more computer processors to receive the design logic comprising the untimed net where the untimed net is indicated as being excluded from timing constraints. The computer-readable program code is executable to generate an upstream event network using shadow logic, wherein the upstream event network comprises at least one untimed transition detector (UTD) corresponding to a first sequential element upstream from the untimed net in the design logic and generate a downstream event network using shadow logic coupled to an output of the upstream event network, wherein the downstream event network comprises at least one metastability timer (MT) corresponding to a second sequential element downstream from the untimed net in the design logic. The computer-readable program code is executable to generate a metastability network using shadow logic where the metastability network is coupled to an output of the MT.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Integrated circuits (ICs) rely on static timing analysis during their design to ensure that they will operate at desired frequencies. Delays between sequential elements (e.g., latches and flip-flops) are constrained to meet target clock periods. As mentioned above, certain signals such as untimed nets may be excluded from timing constraints if the circuit function does not require these nets to switch and propagate to sequential elements within the clock period. For example, configuration signals, which place the circuit into certain modes (e.g., functional mode versus test mode) might only switch during initialization when most sequential elements are inactive. Excluding these signals from timing constraints allows a more efficient design.

However, signals marked as "untimed" may be mistakenly specified by the designer as untimed nets. In fact, when the design is implemented on an IC, the mischaracterized untimed signal may cause a timing failure or a circuit malfunction. The embodiments herein describe techniques for verifying that signals marked as untimed will not functionally impact the circuit design prior to manufacturing the IC.

Figure 1:
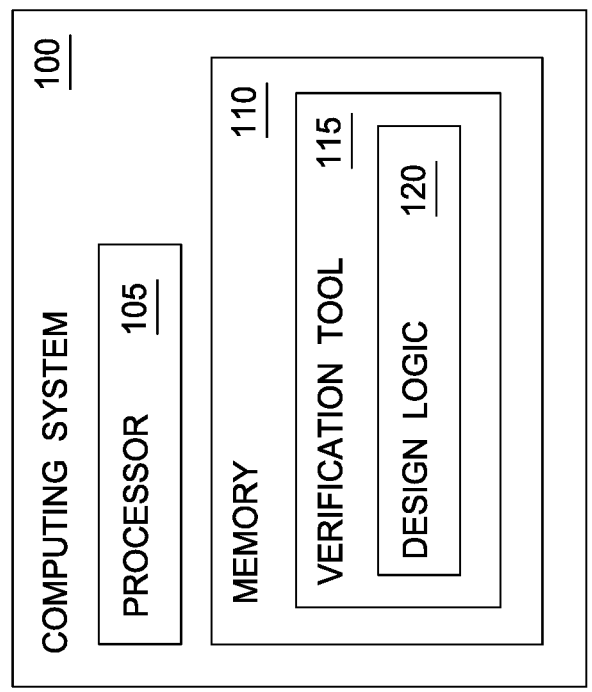
FIG. 1 illustrates a verification tool for verifying design logic, according to one embodiment described herein.

FIG. 1 illustrates a verification tool 115 for verifying design logic 120, according to one embodiment described herein. As shown, FIG. 1 includes a computing system 100 with a processor 105 and memory 110. The processor 105 can represent any number of processing elements which each may include any number of processing cores. The memory 110 can include volatile memory elements, non-volatile memory elements, and combinations thereof. In this example, the memory 110 includes the verification tool 115 (e.g., a software application) which verifies the function and operability of the design logic 120.

In one embodiment, the design logic 120 includes register transfer level (RTL) logic which describes the behavior of a circuit using logical functions such as registers and combinational logic—e.g., logic gates. The verification tool 115 performs one or more operations to verify that the RTL logic performs its intended functions. As discussed in the embodiments below, the verification tool 115 also verifies that the signals marked as untimed nets in the design logic 120 (which are ignored in many other verification tools) does not negatively impact the functionality of the circuit corresponding to the design logic 120.

Figure 2:
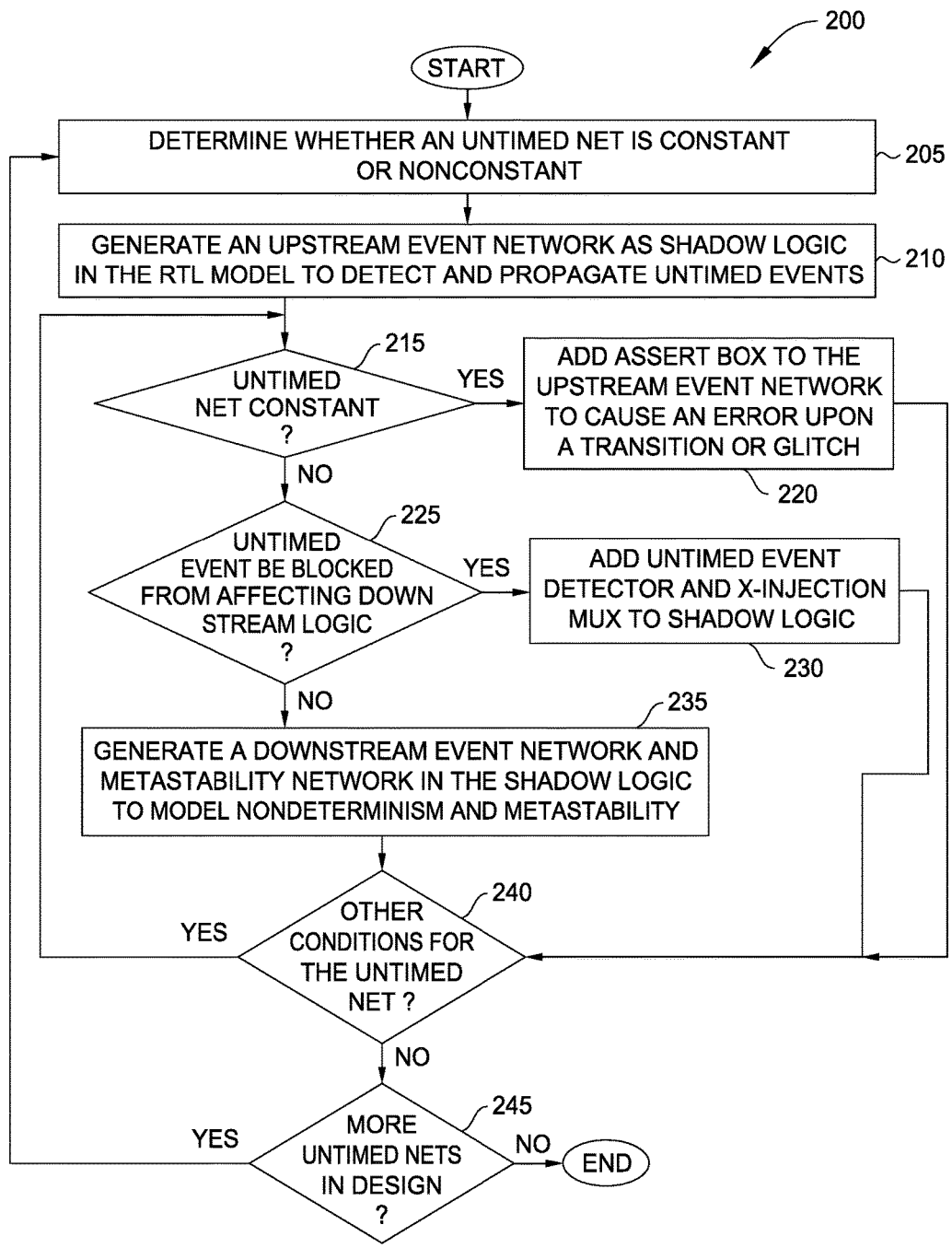
FIG. 2 is a flowchart for verifying untimed nets in design logic, according to one embodiment described herein.

FIG. 2 is a flowchart of a method 200 for verifying untimed nets in design logic, according to one embodiment described herein. Method 200 starts at block 205 where the verification tool determines whether an untimed net has been specified as constant or nonconstant. A constant untimed net is an untimed net that does not change values regardless of any conditions. Some verification tools simply assume that all nets labeled as untimed by a designer are constant nets, and thus, can be ignored. In contrast, a nonconstant untimed net changes values during one or more conditions. For example, a configuration signal that is labeled as an untimed net may change values (e.g., transition or glitch) when the circuit is in a test mode or an initialization mode but not when in a functional mode. Stated differently, some untimed signals may behave as constant signals during one condition (e.g., when the circuit is in the functional mode) but behave as nonconstant signals during another condition (e.g., when the circuit is being initialized).

In one embodiment, the verification tool may rely on a designer to indicate whether an untimed signal should be constant or nonconstant. Alternatively, the verification tool may make this determination itself. To do so, the verification tool can use phase algebra to label each of the untimed nets as constant or nonconstant. The patent application 2015/0161311 titled "Conditional Phase Algebra for Clock Analysis" (which is incorporated herein by reference in its entirety) discloses techniques for using phase algebra for determining if signals in a design are constant or nonconstant. However, that application did not use phase algebra to determine if an untimed signal is constant or nonconstant. That is, the patent application did not look for transitions or glitches on untimed nets that may arise depending on the condition of the circuit. In the embodiments herein, a new phase tag can be used with the phase algebra described in patent application 2015/0161311 that represents nonconstant untimed nets. In one embodiment, the new phase tag for nonconstant untimed nets is "*U". If a constant phase tag (e.g., a "0", "1", or "?") propagates to the untimed net, these tags take precedence over the nonconstant phase tag. However, if an ungated clock phase tag or the new nonconstant phase tag propagates to the untimed net, the untimed net is assigned the nonconstant phase tag, even if the untimed net was previously specified by the designer as a constant untimed net.

Figure 3:
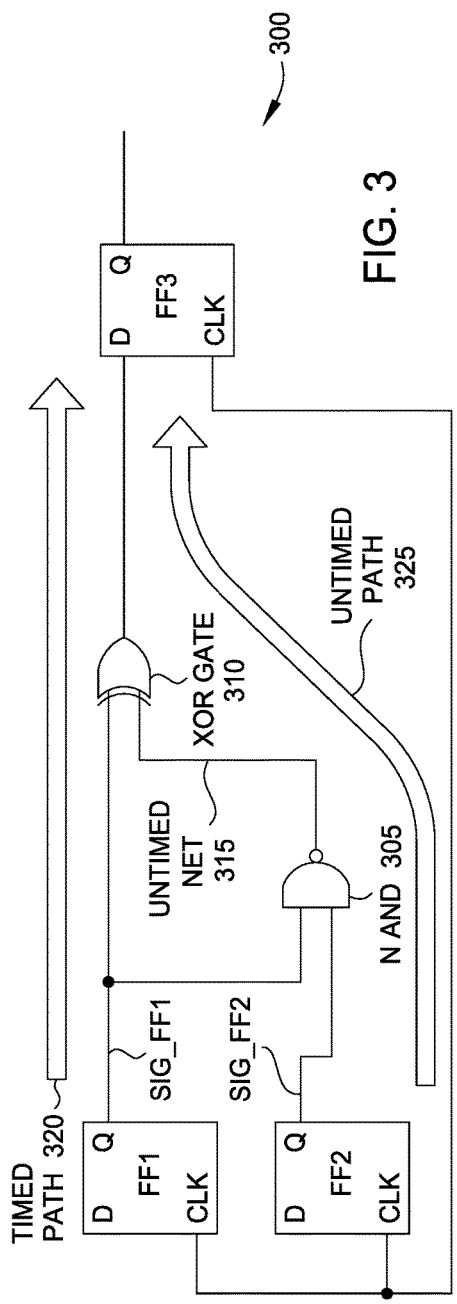
FIG. 3 is design logic with an untimed net, according to one embodiment described herein.

As an example, FIG. 3 illustrates design logic 300 with an untimed net 315. The design logic 300 includes three sequential elements—i.e., flip-flops FF1, FF2, and FF3. In this example, the designer has labeled the net between the NAND gate 305 and the XOR gate 310 as an untimed net 315. As such, the designer believes that for proper operation of the logic 300, it is not required that the untimed net 315 switch and propagate to a sequential element (e.g., FF3) within a period of the clock (CLK) signal.

The path between FF2 and FF3 is labeled as an untimed path 325 since this path includes the untimed net 315. However, the path between FF1 and FF3 is labeled as a timed path 320 since all the nets in this path are timed.

Figure 4:
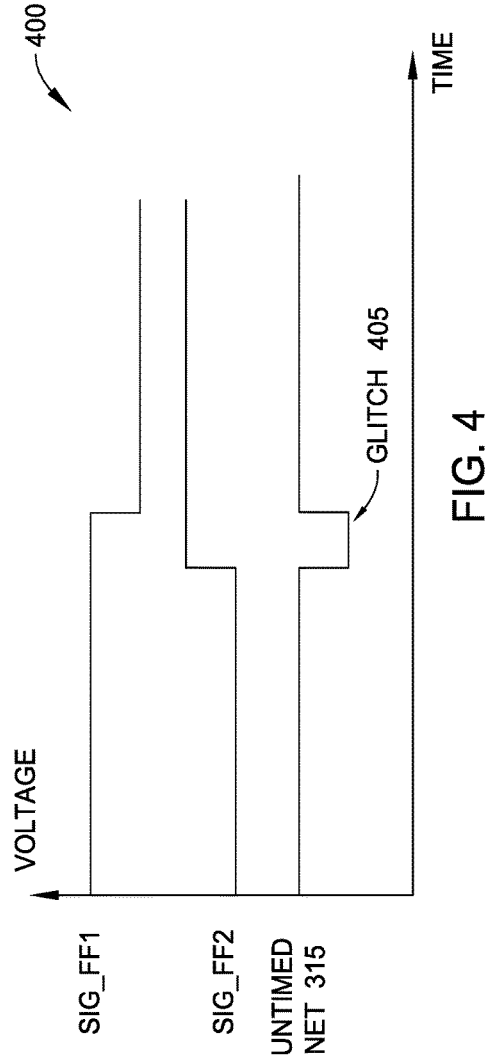
FIG. 4 illustrates a nonconstant untimed net, according to one embodiment described herein.

FIG. 4 illustrates a nonconstant untimed net, according to one embodiment described herein. When evaluating the design logic 300 in FIG. 3, the verification tool determines that the untimed net 315 is nonconstant—i.e., can transition or glitch depending on the mode or condition of the design logic 300. Chart 400 illustrates a situation that can occur in actual hardware where the untimed net 315 is nonconstant. As shown here, because of various delays, the outputs of the FF1 (i.e., SIG_FF1) and FF2 (i.e., SIG_FF2) may reach the input of the NAND gate 305 at slightly different times (e.g., a difference of a few nanoseconds). In this example, SIG_FF2 transitions before SIG_FF1. For the period of time until SIG_FF1 transitions, both signals are high which means the output of the NAND gate 305 (i.e., the untimed net 315) switches to a low output. This glitch 405 is not a problem so long as the output of the NAND gate 305 returns to one before the CLK signal instructs the downstream flip-flop FF3 in actual hardware to capture the data signal at port D. However, the delay on the untimed path 325 may cause the FF3 to capture the resulting data signal caused by the glitch 405 (which can change the output of the XOR gate 310) rather than the resulting data signal when the output of the NAND gate 305 returns to high. The glitch 405 can put the design logic 300 in an unknown or undesired state. This phenomenon may not be detectable in a typical RTL model that does not model circuit delays such as those occurring in untimed paths. As such, the embodiments herein describe techniques for identifying these glitches or transitions in untimed nets in an RTL model and ensuring they cannot affect downstream logic.

Returning to method 200, at block 210, the verification tool generates an upstream event network as shadow logic in the RTL model to detect and propagate untimed events. The shadow logic corresponds to (or "shadows") the original components in the design circuit but does not interfere with those components. The shadow logic monitors the original circuit to detect and propagate untimed events (e.g., transitions or potential glitches) which are then used to generate an error or to inject random behavior to model nondeterminism and metastability that can occur in the actual hardware. In this disclosure, the errors or random behavior is caused by nonconstant untimed nets.

Figure 5:
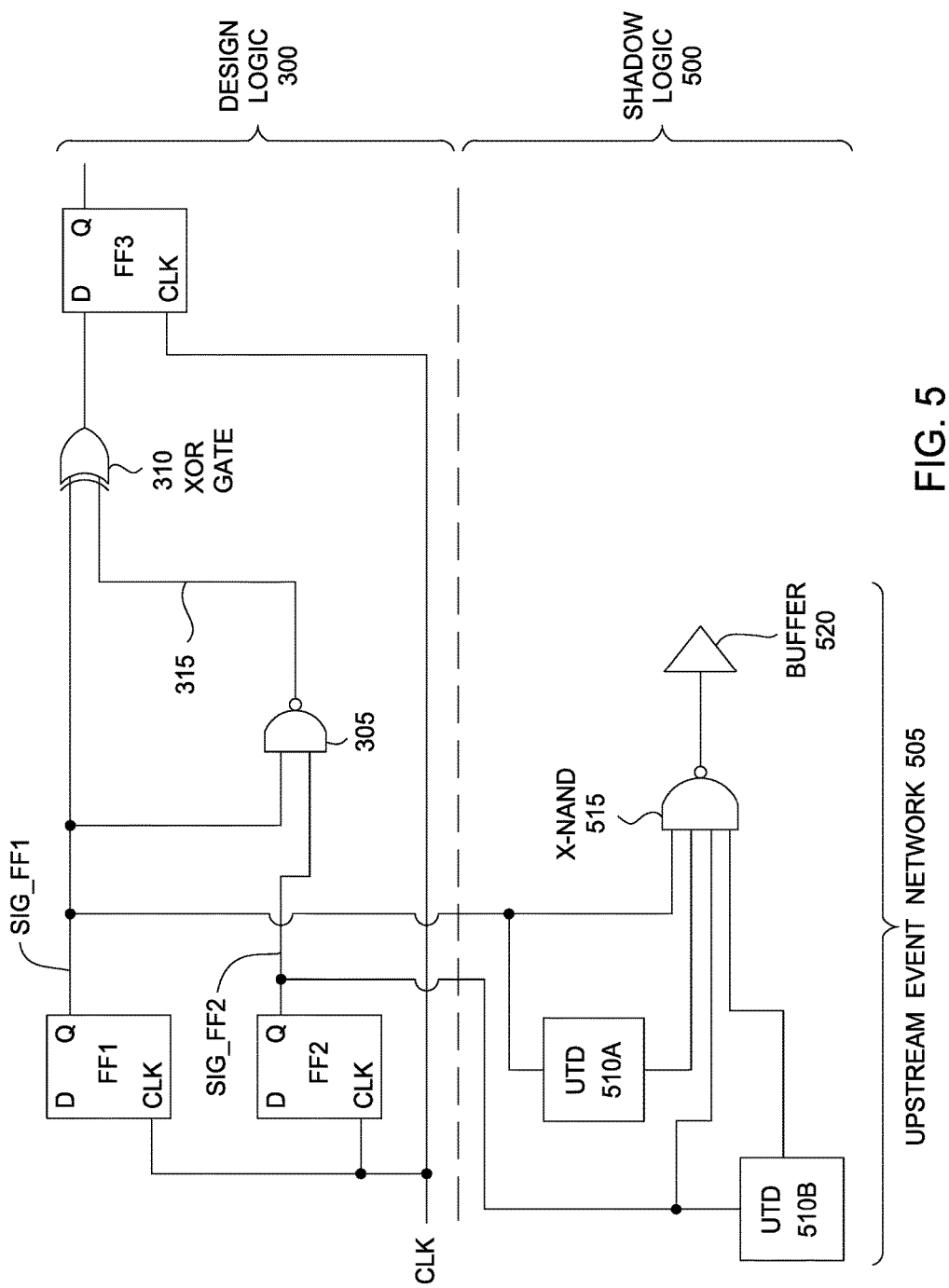
FIG. 5 is design logic with corresponding shadow logic for an upstream event network, according to one embodiment described herein.

FIG. 5 is design logic 300 with corresponding shadow logic 500 for an upstream event network 505. Here, the upstream event network 505 in the shadow logic 500 is generated using the techniques described in U.S. Pat. No. 9,268,889 entitled "Verification of Asynchronous Clock Domain Crossings" (which is incorporated by reference in its entirety). Specifically, FIG. 16 of the '889 patent and its accompanying text provide instructions for generating the upstream event network 505 for the design logic 300. However, while the '889 patent was used for verifying timings corresponding to asynchronous clock domain crossings (i.e., signals or nets that are between two different clock domains or networks), similar techniques can be employed in this application to generate shadow logic 500 upstream of the untimed net 315.

As shown, the verification tool inserts untimed transition detectors (UTD) 510 which each correspond to one of the flip-flops FF1 and FF2 in the design logic 300. That is, the asynchronous transition detectors described in patent '889 are repurposed as the UTDs 510. The UTDs 510 generate a short pulse (e.g., one simulation tick) whenever the design signal being monitored transitions. For example, when SIG_FF2 transitions from low to high as shown in chart 400 of FIG. 4, UTD 510B outputs a short pulse which indicates that an event (i.e., the transition on SIG_FF2) occurred.

If both SIG_FF1 and SIG_FF2 transition at the same time during simulation of the RTL model, the UTDs 510 both output a short pulse which can cause the output of an X-NAND gate 515 to output a short pulse. This short pulse indicates that the transitions in the outputs of the flip-flops FF1 and FF2 can potentially result in the glitch 405 shown in FIG. 4. In this manner, the shadow logic 500 captures and propagates events that can cause the design logic 300 to malfunction.

The shadow logic 500 also includes a buffer 520 at the output of the X-NAND gate 515. The buffer 520 (and the name of its output net) signifies that downstream of the untimed net 315 events no longer correspond to any specific clock domain. Rather, these events correspond to a pseudo clock domain labeled as "untimed." Because any data paths that include the untimed net 315 are not timed, transitions on these paths have no fixed delay relative to any clock domain.

In one embodiment, instead of a UTD 510 for each sequential element in the fan-in for the untimed net 315, the verification tool may add only one UTD in the shadow logic 500. Here, the single UTD probes the untimed net 315 and drives the output signal for the upstream event network directly. Doing so simplifies the resulting model and can detect transitions on the untimed net 315, but not potential glitches.

Moreover, the embodiments herein may be used if the untimed net 315 is driven by logic in different clock domains. In that scenario, the verification tool generates a separate upstream event network for each of the clock domains. Instead of the buffer 520, the shadow logic 500 would include an OR gate to combine together the event signals from different clock domains. This is described in detail in the '889 patent which generates shadow logic for multiple clock domains.

Returning to method 200, at block 215, the verification tool determines if the untimed net has been specified as constant. In one embodiment, if the untimed net does not receive a nonconstant phase tag during any condition or mode of operation, the untimed net is deemed as being specified constant and method 200 proceeds to block 220 where the verification tool adds an assert box to the upstream event network to cause an error upon a transition or glitch. For example, if a untimed net was specified by a designer as being constant, but then using the techniques described above the verification tool determines the untimed net is actually nonconstant (i.e., the untimed net violates the specification as being constant), the tool may report an error which can mean the untimed net was incorrectly specified as constant or there is a flaw in the design.

Figure 6:
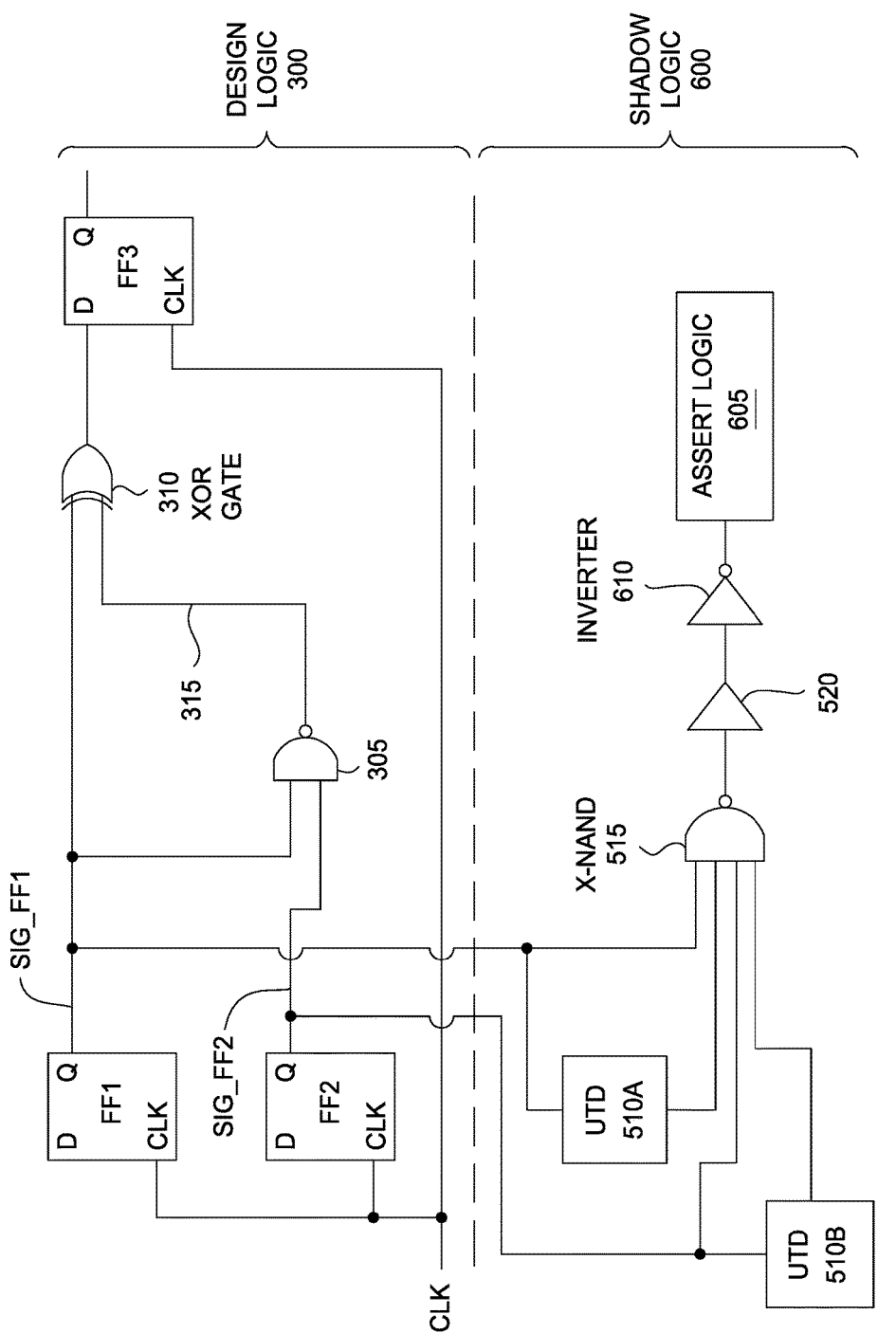
FIG. 6 is design logic with corresponding shadow logic for an assert box, according to one embodiment described herein.

FIG. 6 is design logic 300 with corresponding shadow logic 600 that includes assert logic 605, according to one embodiment described herein. As shown, the verification tool adds an inverter 610 which is coupled to the output of the buffer 520—i.e., the output of the upstream event network 505. The assert logic 605—i.e., the assert box—is then coupled to the output of the inverter 610. The assert logic 605 causes a verification error if its input is ever zero. Thus, the assert logic 605 checks that the untimed net remains constant when verification is performed. If the assert logic 605 generates an error, this informs the designer that the design may not be correct, or that the specification is incorrect, in which case the verification may be re-run, but this time the untimed net is labeled as being nonconstant for the particular condition under consideration.

Moreover, if the untimed net is supposed to be constant only under a certain condition, then the inverter 610 can be replaced by a NAND gate whose other input is connected to a signal in the design logic 300 representing the condition. That way, the assert logic 605 outputs an error only if the untimed net is not constant and the condition is satisfied.

Returning to FIG. 2, if the untimed net is labeled as nonconstant, method 200 proceeds to block 225 where the verification tool determines whether the untimed event should be blocked from affecting downstream logic. Certain verification environments require that nonconstant untimed nets are fenced (gated) to prevent interference with downstream logic. One example is a built-in self-test where the circuit exercises its logic paths with pseudorandom data that is captured by latches, compressed into a signature and compared to an expected result. To prevent the untimed net from corrupting the signature, at block 230, the verification tool adds an untimed event detector and X-injection multiplexer (mux) to the shadow logic. The X-injection mux drives an 'X' value on the untimed net if the net transitions or has a potential glitch. The 'X' will persist until reset by a user-defined mechanism, indicating that the time window in which corruption must be prevented has ended.

Figure 7:
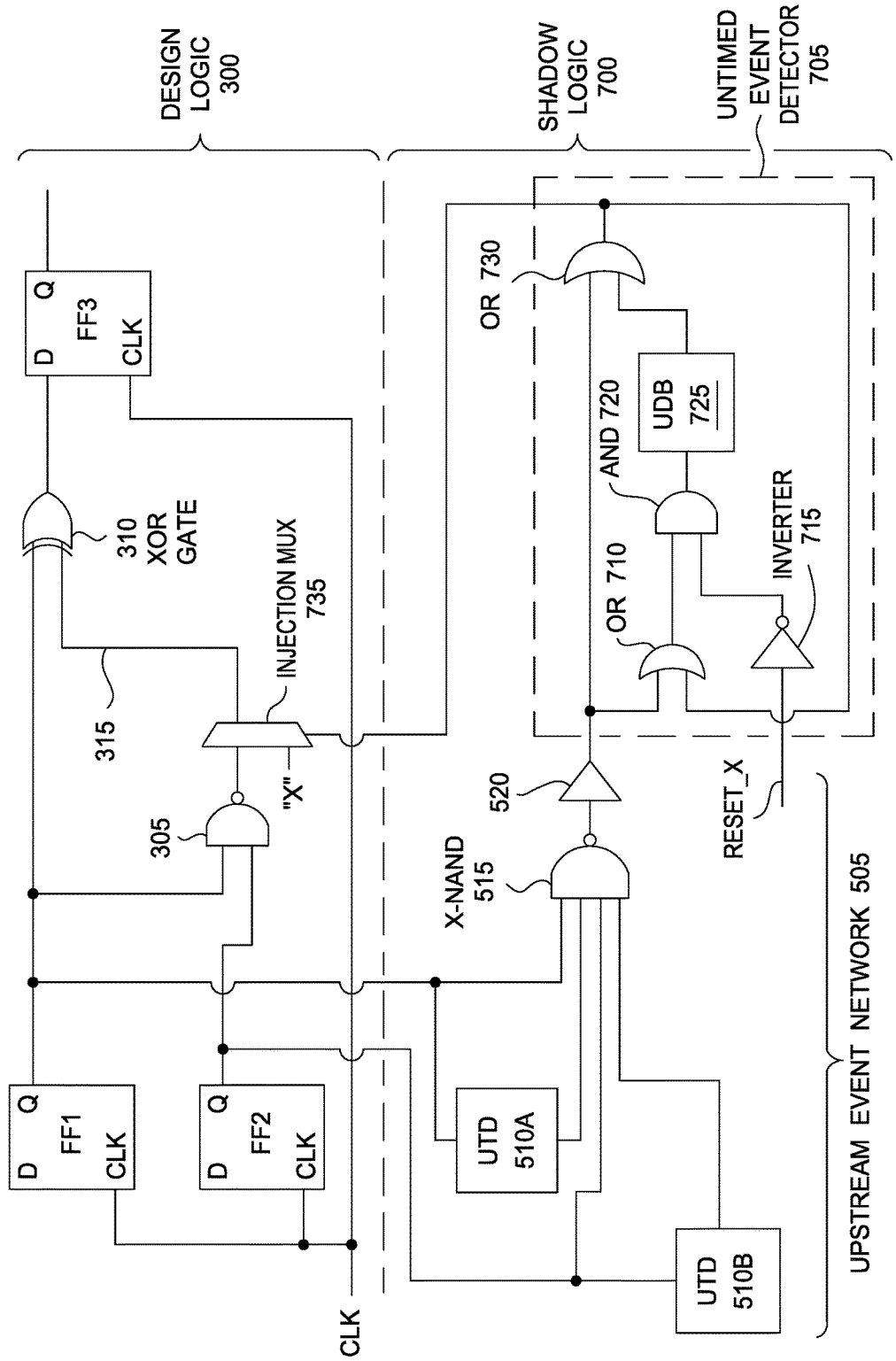
FIG. 7 is design logic with corresponding shadow logic for an untimed event detector, according to one embodiment described herein.

FIG. 7 is design logic 300 with corresponding shadow logic 700 for an untimed event detector 705, according to one embodiment described herein. Unlike in FIG. 6 where assert logic is coupled to the upstream event network 505, here, the buffer 520 is coupled to OR gates 710 and 730 in the untimed event detector 705. The detector 705 comprises logic that functions in a similar way as the asynchronous sample detector described in patent '889. The detector 705 includes a unit delay block (UDB) 725 which latches an event coming from the upstream event network 505. When an event arrives from the network 505, the combination of the OR gate 710, inverter 715, and AND gate 720 cause the output signal of the UDB 725 to go high and remain high until a signal RESET_X is asserted. When the output signal of the untimed event detector 705 is a one (i.e., when the output of the OR gate 730 is a one), an X-injection mux 735 added to the design logic 300 selects an 'X' which propagates downstream of the untimed net 315 instead of the original untimed net's value. In one embodiment, using the X-injection mux 735 and the untimed event detector to inject the X states into the design logic 300 is performed using a three-value verification tool that can support testing using three states—i.e., "0", "1", and "X."

Returning to FIG. 2, if the untimed event is not blocked, method 200 proceeds to block 235 where the verification tool generates a downstream event network and metastability network in the shadow logic to model nondeterminism and metastability. The details of block 235 are discussed in more detail in the examples that follow.

At block 240, the verification tool determines if the current untimed net has been evaluated for all the possible conditions. As mentioned above, the untimed net may be constant for some conditions and nonconstant for others. Thus, for each such condition of the untimed net, the verification tool may return to block 215 to ensure the corresponding shadow logic has been added to the upstream event network.

After all the conditions of interest have been evaluated for a selected untimed net, the verification tool determines at block 245 whether additional untimed nets need to be evaluated in the design logic. The verification tool may repeat method 200 for each of the untimed nets in the design logic.

Although not shown in method 200, once the shadow logic is complete (i.e., method 200 terminates), the verification tool may perform verification using the shadow logic to ensure that the untimed nets do not alter or affect the functionality of the design logic.

Figure 8:
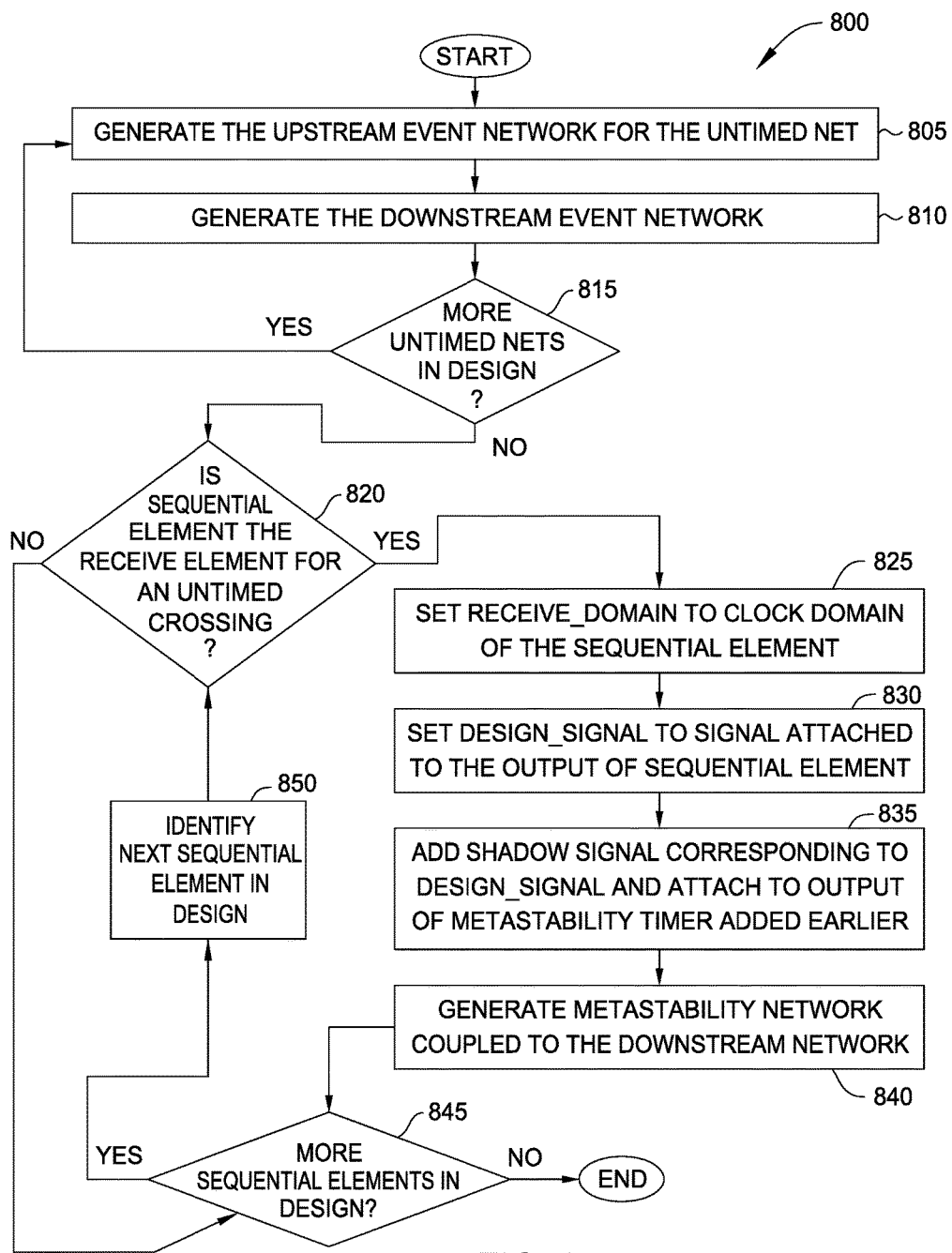
FIG. 8 is a flowchart for verifying nonconstant untimed nets, according to one embodiment described herein.

FIG. 8 is a flowchart of a method 800 for verifying nonconstant untimed nets, according to one embodiment described herein. In FIG. 8, it is assumed that the untimed net is nonconstant. For example, the verification tool may have already performed the techniques described above for determining if the untimed net is constant or nonconstant using, e.g., phase algebra.

At block 805, the verification tool generates the upstream event network for one of the untimed nets in design logic. In one embodiment, block 805 is the same as block 210 in method 200 where the upstream event network is generated using shadow logic in the RTL model to create and propagate untimed events. An example of generating an upstream event network in shadow logic is shown in FIG. 5.

At block 810, the verification tool generates the downstream event network which is coupled to the upstream event network. In one embodiment, blocks 810-845 correspond to block 230 in method 200 where the downstream event network and metastability network are generated in the shadow logic.

Figure 9:
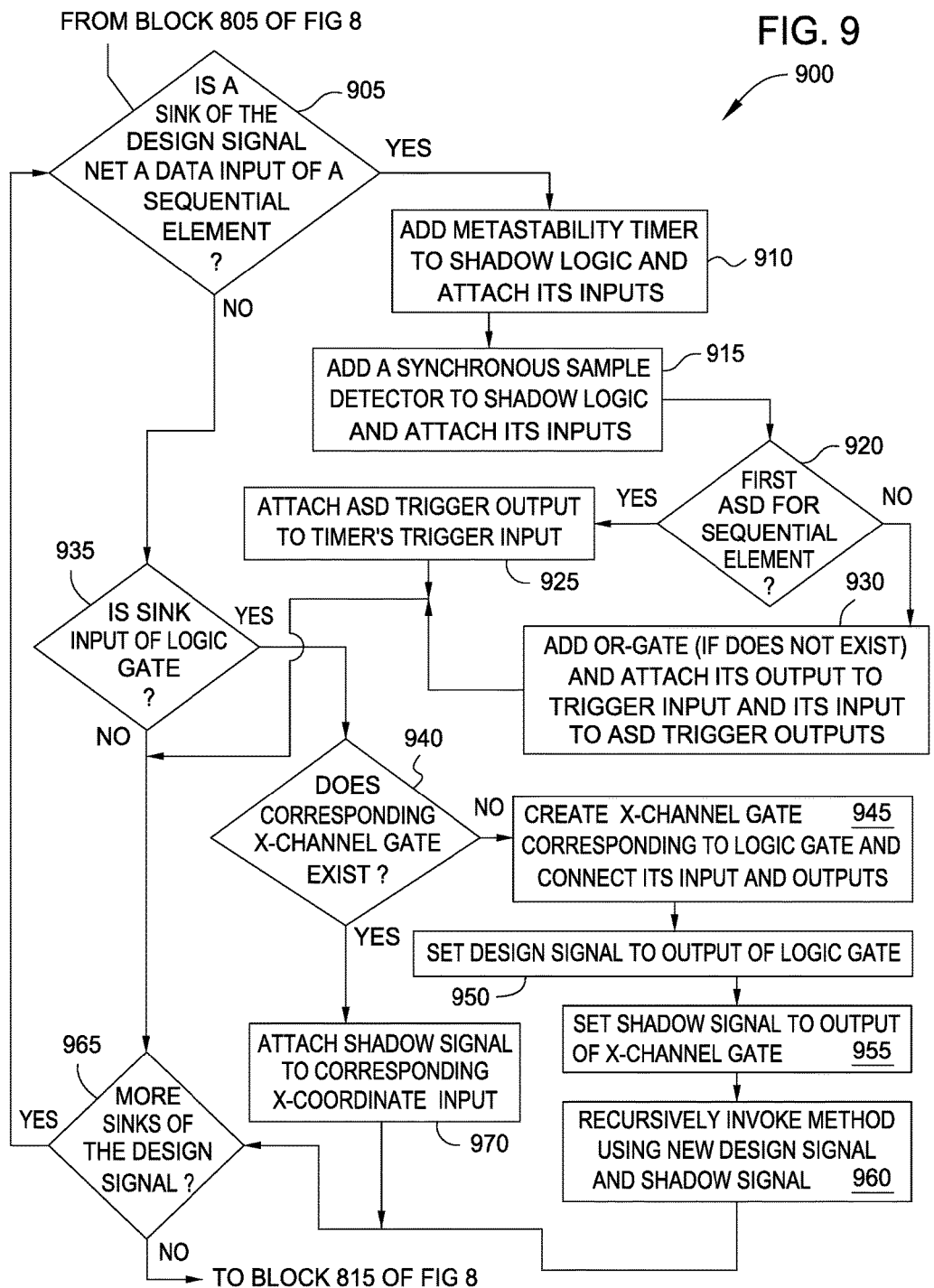
FIG. 9 is a flowchart for generating a downstream event network for an untimed net, according to one embodiment described herein.

For clarity, the details of generating the downstream event network in the shadow logic are illustrated in FIG. 9 which is a flowchart of a method 900 for generating a downstream event network for an untimed net. For clarity, FIG. 9 is a high level description of the exemplary pseudo code illustrated in Table 1 below. For example, method 900 may begin when the verification tool calls the procedure labeled "generate_downstream_event_network_for_signal" using the arguments design_signal, shadow_signal and a condition. The design_signal is a selected signal in the design logic 300; e.g., an untimed net; and the shadow_signal is a signal previously created in the shadow logic; e.g., the output of the upstream event network. The condition is the current condition of the design logic being analyzed (e.g., functional mode, test mode, initialization mode, etc.).

In one embodiment, method 900 is performed after block 805 of FIG. 8 when the verification tool generates the upstream event network. At block 905, the verification tool determines if a sink of the design_signal net is a data input of a sequential element. Stated differently, the verification tool determines if there is a sequential element (e.g., flip-flop or latch) that has an input pin coupled to the design_signal. If so, this means that method 900 has traversed to the end of the untimed path (which can include one or more logic gates and nets between sequential elements).

Figure 10:
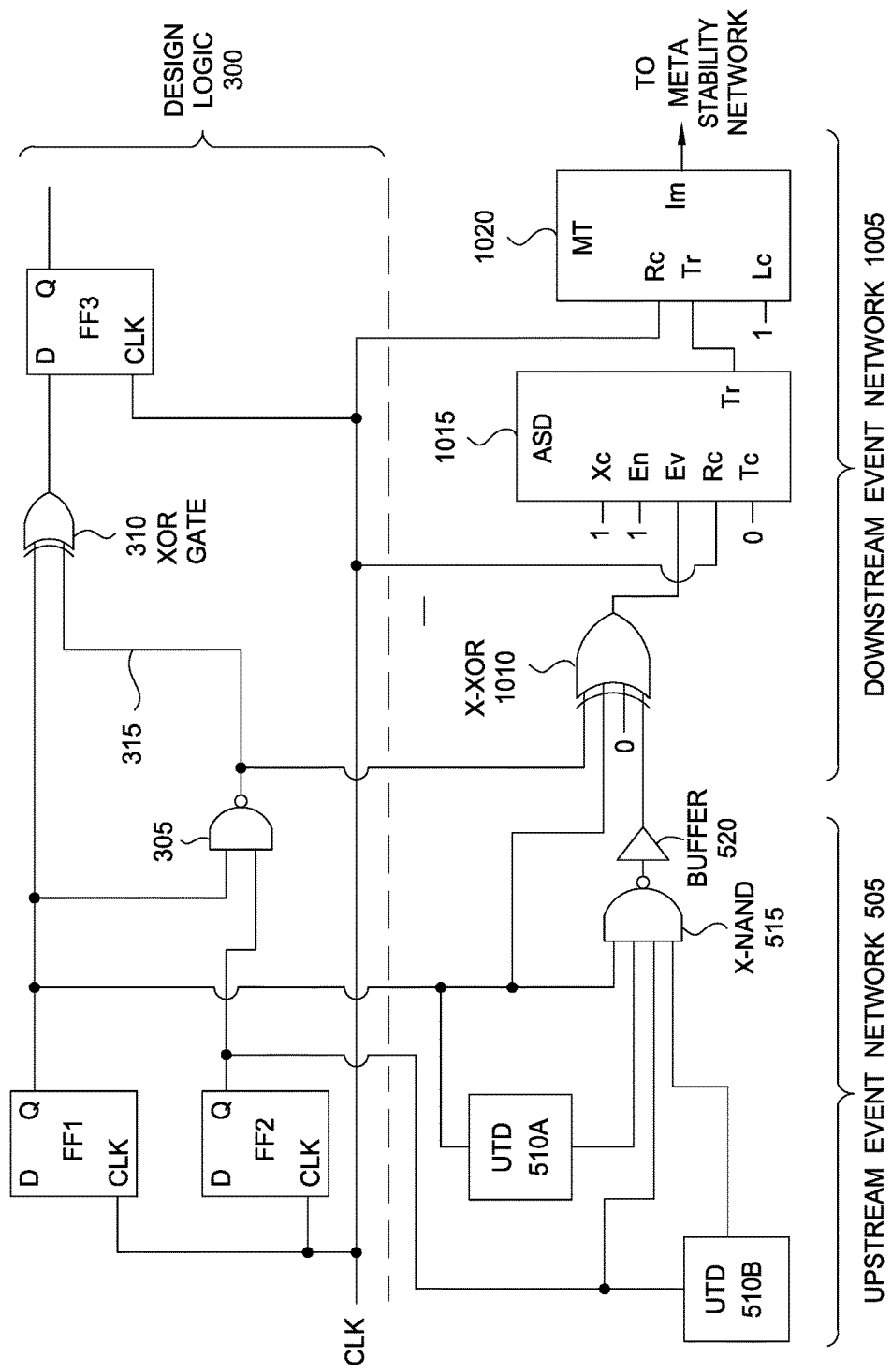
FIG. 10 is design logic with corresponding shadow logic for a downstream event network, according to one embodiment described herein.

However, if the design signal is not sinked by a sequential element, method 900 proceeds to block 935 where the verification tool determines if the sink of the design signal is an input of a logic gate—e.g., an AND gate, OR gate, NAND gate, XOR gate, etc. If no, method 900 proceeds to block 965; otherwise, method 900 proceeds to block 940 where the verification tool determines whether a corresponding X-channel gate exists in the shadow logic as described in the '889 patent. For clarity, the blocks in FIG. 9 are described in conjunction with the logic illustrated in FIG. 10. Specifically, FIG. 10 illustrates the design logic 300 with corresponding shadow logic 1000 for a downstream event network 1005. The design logic 300 is the same as the design logic 300 shown in FIG. 3. Moreover, the upstream event network 505 is the same as the network 505 in FIG. 5.

In FIG. 10, the only sink for the untimed net 315 is the input of the XOR gate 310 in the design logic 300. Thus, when the verification tool performs method 900, at block 935, the tool determines that the sink is an input of a logic gate—i.e., XOR gate 310. Assuming this is the first time the untimed net 315 has been evaluated, at block 940, the verification tool determines that the X-channel gate (i.e., the shadow logic gate) which corresponds to the XOR gate 310 in the design logic 300 has not yet been created. As such, at block 945, the verification tool creates the X-channel gate—i.e., X-XOR gate 1010 in the downstream event network 1005. Moreover, the verification tool couples the inputs and outputs to other shadow logic in the untimed path, or in this case, to the output of the upstream event network 505.

Although FIG. 10 illustrates only one logic gate coupled to a sink of the untimed net 315, in other examples, multiple different logic gates may be sinks of the untimed net. Also, multiple logic gates may be chained together in the untimed path, which can include multiple nets. As such, the verification tool recursively performs at least a portion of method 900 to ensure that all the logic gates in the untimed path are considered. At block 950, the verification tool sets a design signal to the output of the logic gate in the design logic 300—i.e., the output of the XOR gate 310. At block 955, the verification tool sets a shadow signal value to output of the corresponding X-channel gate—i.e., the output of X-XOR gate 1010. At block 960, the verification tool recursively invokes method 900 using the newly set design signal and shadow signal values; i.e., the output of the XOR gate 310 and X-XOR gate 1010 to determine if a sink of the design signal is an input of a sequential element at block 905 or an input of a different logic gate at block 935. That is, method 900 proceeds to block 965 and again calls the procedure "generate_downstream_event_network_for_signal" in Table 1 using the new values of the design signal and shadow signal set at blocks 950 and 955.

Returning to block 940 of method 900, if the X-channel gate already existed in the shadow logic—i.e., X-XOR 1010 had already been created, method 900 proceeds to block 970 where the verification tool attaches the shadow signal to the corresponding X-coordinate (Xc) input of an asynchronous sample detector (ASD) 1015. However, this step is not shown in FIG. 10 since the untimed net 315 is only one input of the XOR gate 310. That is, there are not multiple paths where the untimed net 315 has a sink at multiple inputs of the XOR gate 310. For example, an untimed net may be coupled to the same logic gate multiple times. Thus, when the method 900 is recursively called, the verification tool will traverse all the paths from the untimed net and reach a logic gate that was already created. In that case, the verification tool knows it has reached a portion of the untimed path that has already been traversed, and thus, another recursive call is not needed. Instead, method 900 proceeds to block 965 to determine if there are other sinks of the design signal that should be considered.

Returning to block 905, if the verification tool determines a sink for the untimed net serves as an input to a sequential element, method 900 proceeds to block 910. For example, after the verification tool has added the X-XOR gate 1010 and recursively called method 900, the tool determines that the output of the XOR gate 310 is an input to the flip-flop FF3 at block 905. As such, method 900 proceeds to block 910 and adds a metastability timer (MT) 1020 to the shadow logic in the downstream event network 1005 and couples its inputs (i.e., a trigger (Tr), receive clock (Rc), and local clock (Lc)) as shown in FIG. 10 and described in Table 1. The MT 1020 serves as an interface between the downstream event network 1005 and the metastability network in the shadow network which is described below.

At block 915, the verification tool adds the ASD 1015 to the shadow logic and couples its inputs to the X-channel logic discussed above (i.e., X-XOR gate 1010). At block 920, the verification tool determines whether the ASD 1015 added during block 915 is the first ASD for the sequential element (e.g., FF3). If so, at block 925, the verification tool attaches the ASD 1015 trigger (Tr) output to the trigger input of the MT 1020. If not, at block 930, the verification tool adds an OR-gate (if one has not been added already) to the downstream event network 1005 and attaches the output of the OR gate to the trigger input of the MT 1020 and the input to the trigger outputs for all the ASDs 1015 for the sequential element. As shown in FIG. 10, the output of the MT 1020 (i.e., Im) can then be fed into a metastability network in the shadow logic.

When used to verify the design logic, the ASD 1015 generates a trigger signal at the output Tr which goes high whenever the input event signal (Ev) pulses. The output Tr remains high until the next rising edge of the clock (which feeds the Rc input to the ASD 1015). At the next rising edge, the Im output of the MT 1020 goes high for one clock period indicating that the corresponding sequential element (FF3) may be in a metastable state. The output of the MT 1020 is connected to the metastability network and random injectors (not shown) in the metastability network cause the verification tool to model one clock period of nondeterminism or metastability resulting from transitions or potential glitches on untimed nets.

The method 900 proceeds to block 965 to determine if there are more sinks of the design signal that should be evaluated. If not, the method 900 ends and returns to block 815 of FIG. 8. In this manner, the verification tool can generate the downstream event network 1005 that includes X-channel logic gates coupled to the untimed net, at least one MT 1020, and at least one ASD 1015. In one embodiment, there is at most one MT 1020 for each sequential element.

At block 815, the verification tool determines if there are more untimed (nonconstant) nets in the design logic. If so, method 800 repeats blocks 805 and 810 to generate upstream and downstream event networks for these nets. However, assuming all the untimed nets have been evaluated, method 800 proceeds to block 820 where the verification tool determines if a sequential element in the design logic is the receive element for an untimed crossing. As used herein, an untimed crossing is any data path that includes an untimed net. In FIG. 10, the FF3 is a sequential element that satisfies the query at block 820. In response, method 800 proceeds to block 825 where the verification tool sets receive_domain to the clock domain of the sequential element—i.e., CLK of FF3. Doing so determines which clock domain is used during verification. The MT 1020 tracks how long the sequential element FF3 is in a metastability state so the verification tool knows which clock domain to use for counting the clock cycles.

At block 830, the verification tool sets design_signal to the signal attached to the output of the sequential element—i.e., the Q port of FF3. At block 835, the verification tool adds the shadow signal corresponding to design_signal and attaches the shadow_signal to the output of the MT 1020 added earlier at block 810 that corresponds to the sequential element identified at block 820—i.e., FF3. This identifies the end of the downstream event network which is then attached to the metastability network.

At block 840, the verification tool generates the metastability network coupled to the downstream event network. In one embodiment, the metastability network is generated using the techniques described in the '889 patent mentioned above. For example, FIG. 24 of the '889 patent illustrates a technique for generating a metastability network for asynchronous crossings which can also be used for the untimed crossings described herein. To do so, the verification tool may call the procedure generate_is_meta_network_for_signal described in the '889 patent using the design_signal, shadow_signal, and receive_domain identified at blocks 825, 830, and 835 as arguments. However, the embodiments in this disclosure are not limited the techniques described in the '889 patent and can be used with other techniques for generating a metastability network.

At block 845, the verification tool determines if there are more sequential elements in the design logic to be evaluated. If so, method 800 proceeds to block 850 to identify the next sequential element in the design and then proceeds to block 820 to determine if the next sequential element receives an untimed path. If not, method 800 ends. Once an upstream event network, downstream event network, and metastability network are generated in shadow logic for each nonconstant untimed net, the verification tool can execute the model to evaluate the nondeterminism and metastability of the design logic that results from transitions or glitches on the untimed net. For example, whenever the output of the MT goes high, the metastability network causes the verification model to model one or more clock periods of nondeterminism or metastability resulting from transitions or potential glitches on untimed nets.

TABLE 1

```
1  procedure generate_downstream_event_network_for_signal
2     formal arguments: design_signal, shadow_signal, condition
3     return type: null
4  {
5     for each sink (component input pin) of design_signal {
6        if ( sink is data input of a sequential element (latch or flip-flop) )
7        {
8           Add a metastability timer device to the verification model.
9           Attach the timer's rcv_clock (Rc) input to the sample clock signal for the clock domain.
10          Attach the timer's local_clock (Lc) input to the sequential element's clock.
11          (If the clock is ungated, this input may optionally be tied to one instead.)
12          Add an asynchronous sample detector (ASD) to the verification model.
13          if ( this is the first such ASD created for this sequential element ) {
14                Attach the ASD's trigger (Tr) output to the metastability timer's trigger (Tr) input
15                   via a new signal, called the trigger signal.
16                }
17          }
18          else {
19                Add an OR-gate if one does not already exist for this sequential element,
20                   and attach its output to the trigger input of the metastability timer via a signal.
21                Attach one of the OR-gate inputs to the ASD's trigger output via a signal.
22          }
23             If the sequential element is a transparent latch pair and the first latch in the pair
24                has a gated clock, then attach this clock to the ASD's xpar_clock (Xc) input;
25                else tie Xc to one.
26          Attach the ASD's enable (En) input to an enable mechanism if desired, else tie to one.
27             Attach the ASD's rcv_clock (Rc) input to the sample clock signal for the given clock
28                domain.
29             Tie the ASD's tmit_clock (Tc) input to zero. (This input is not used by this invention.)
30             Attach the ASD's event (Ev) input to shadow_signal.
31          } // end for each clock domain . . .
32       } // end if sink is data input of sequential element
33       else if sink is input of logic gate (e.g., buffer, inverter, AND, XOR) or unit delay block
34             (UDB)
35          {
36             if ( there already exists an X-channel gate corresponding to the design's logic gate
37                and the untimed pseudodomain )
38             {
39                Attach shadow_signal to corresponding X-coordinate input of X-channel gate
40                   (which should formerly have been tied to zero).
41             }
42             else {
43                Create X-channel gate corresponding to design's logic gate for the untimed
44                   pseudodomain.
45                Attach each binary coordinate input (if any) to the corresonding design signals.
46                Attach the X-coordinate input corresponding to the design_signal's sink to
47                   shadow_signal, and tie any other X-coordinate inputs to zero (for now).
48                Let output_design_signal refer to signal attached to output of logic gate.
49                Add a new signal to the verification model, with the same name as
50                   output_design_signal but with a suffix of ".event.untimed".
51                Let output_shadow_signal refer to this newly created signal.
52                Attach output_shadow_signal to the output of the new X-channel gate.
53                Recursively call generate_downstream_event_network_for_signal
54                   (output_design_signal, output_shadow_signal, condition).
55             }
55       } // end if sink is input of logic gate . . .
56     } // end for
57     Return.
59  } // end procedure
```

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving design logic comprising an untimed net, wherein the untimed net is indicated as being excluded from timing constraints;
   generating, using one or more computer processors, an upstream event network using shadow logic, wherein the upstream event network comprises at least one untimed transition detector (UTD) corresponding to a first sequential element upstream from the untimed net in the design logic;
   generating a downstream event network using shadow logic coupled to an output of the upstream event network, wherein the downstream event network comprises at least one metastability timer (MT) corresponding to a second sequential element downstream from the untimed net in the design logic;
   generating a metastability network using shadow logic, wherein the metastability network is coupled to an output of the MT;
   verifying the design logic using the upstream event network shadow logic, the downstream event network shadow logic, and the metastability network shadow logic; and
   manufacturing an integrated circuit based on the verified design logic.

2. The method of claim 1, further comprising:
   adding an asynchronous sample detector (ASD) to the downstream event network, wherein the ASD is coupled between the MT in the downstream event network and the shadow logic in the upstream event network.

3. The method of claim 1, further comprising:
   identifying a sink of the untimed net that serves as an input to a logic gate in the design logic; and
   adding a X-channel logic gate to the downstream event network corresponding to the logic gate, wherein the X-channel logic gate is upstream of the MT in the downstream event network.

4. The method of claim 3, further comprising:
   after adding the X-channel logic gate, determining whether an output of the logic gate in the design logic is an input to another logic gate in the design logic, if so, adding another X-channel logic gate to the downstream event network.

5. The method of claim 3, further comprising:
   after adding the X-channel logic gate, following a different path along the untimed net to another input of the logic gate in the design logic; and
   upon determining the X-channel logic gate already exists in the downstream event network, attach the X-channel logic gate to an x-coordinate input of an ASD in the downstream event network.

6. The method of claim 1, further comprising:
   determining a condition of the design logic when the untimed net is nonconstant because of a transition or potential glitch.

7. The method of claim 6, wherein determining the condition when the untimed net is nonconstant comprises using phase algebra.

8. The method of claim 1, further comprising:
   verifying that the untimed net does not affect a function of the design logic by:
   generating a trigger signal using an ASD in the downstream event network in response to a transition or potential glitch in the untimed net;
   outputting a pulse using the MT in response to the trigger signal for at least one clock cycle; and
   modeling at least one clock cycle of nondeterminism or metastability in the metastability network in response to the pulse.

9. A system, comprising:
   at least one computer processor; and
   a memory storing a program, wherein, when executed by the computer processor, the program is configured to perform an operation comprising:
   receiving design logic comprising an untimed net, wherein the untimed net is indicated as being excluded from timing constraints;
   generating an upstream event network using shadow logic, wherein the upstream event network comprises at least one untimed transition detector (UTD) corresponding to a first sequential element upstream from the untimed net in the design logic;
   generating a downstream event network using shadow logic coupled to an output of the upstream event network, wherein the downstream event network comprises at least one metastability timer (MT) corresponding to a second sequential element downstream from the untimed net in the design logic;
   generating a metastability network using shadow logic, wherein the metastability network is coupled to an output of the MT;
   verifying the design logic using the upstream event network shadow logic, the downstream event network shadow logic, and the metastability network shadow logic; and
   manufacturing an integrated circuit based on the verified design logic.

10. The system of claim 9, wherein the operation further comprises:
    adding an asynchronous sample detector (ASD) to the downstream event network, wherein the ASD is coupled between the MT in the downstream event network and the shadow logic in the upstream event network.

11. The system of claim 9, wherein the operation further comprises:
    identifying a sink of the untimed net that serves as an input to a logic gate in the design logic; and
    adding a X-channel logic gate to the downstream event network corresponding to the logic gate, wherein the X-channel logic gate is upstream of the MT in the downstream event network.

12. The system of claim 11, wherein the operation further comprises:
    after adding the X-channel logic gate, determining whether an output of the logic gate in the design logic is an input to another logic gate in the design logic, if so, adding another X-channel logic gate to the downstream event network.

13. The system of claim 11, wherein the operation further comprises:
after adding the X-channel logic gate, traversing a different path along the untimed net to another input of the logic gate in the design logic; and
upon determining the X-channel logic gate already exists in the downstream event network, attach the X-channel logic gate to an x-coordinate input of an ASD in the downstream event network.

14. The system of claim 9, wherein the operation further comprises:
determining a condition of the design logic when the untimed net is nonconstant because of a transition or potential glitch.

15. The system of claim 14, wherein determining the condition when the untimed net is nonconstant comprises using phase algebra.

16. A computer program product for verifying function of a design logic comprising an untimed net, the computer program product comprising:
a computer-readable storage medium having computer-readable program code embodied therewith, the computer-readable program code executable by one or more computer processors to:
receive the design logic comprising the untimed net, wherein the untimed net is indicated as being excluded from timing constraints;
generate an upstream event network using shadow logic, wherein the upstream event network comprises at least one untimed transition detector (UTD) corresponding to a first sequential element upstream from the untimed net in the design logic;
generate a downstream event network using shadow logic coupled to an output of the upstream event network, wherein the downstream event network comprises at least one metastability timer (MT) corresponding to a second sequential element downstream from the untimed net in the design logic;
generate a metastability network using shadow logic, wherein the metastability network is coupled to an output of the MT;
verify the design logic using the upstream event network shadow logic, the downstream event network shadow logic, and the metastability network shadow logic; and
manufacture an integrated circuit based on the verified design logic.

17. The computer program product of claim 16, wherein the computer-readable program code is further executable to:
add an asynchronous sample detector (ASD) to the downstream event network, wherein the ASD is coupled between the MT in the downstream event network and the shadow logic in the upstream event network.

18. The computer program product of claim 16, wherein the computer-readable program code is further executable to:
identify a sink of the untimed net that serves as an input to a logic gate in the design logic; and
add a X-channel logic gate to the downstream event network corresponding to the logic gate, wherein the X-channel logic gate is upstream of the MT in the downstream event network.

19. The computer program product of claim 18, wherein the computer-readable program code is further executable to:
after adding the X-channel logic gate, determine whether an output of the logic gate in the design logic is an input to another logic gate in the design logic,
if so, add another X-channel logic gate to the downstream event network.

20. The computer program product of claim 18, wherein the computer-readable program code is further executable to:
after adding the X-channel logic gate, following a different path along the untimed net to another input of the logic gate in the design logic; and
upon determining the X-channel logic gate already exists in the downstream event network, attach the X-channel logic gate to an x-coordinate input of an ASD in the downstream event network.

* * * * *